United States Patent [19]

Maccabee

[11] Patent Number: 4,991,149
[45] Date of Patent: Feb. 5, 1991

[54] UNDERWATER OBJECT DETECTION SYSTEM

[75] Inventor: Bruce S. Maccabee, Sabillasville, Md.

[73] Assignee: The United States of America as represented by the Secretary of the Navy, Washington, D.C.

[21] Appl. No.: 447,321

[22] Filed: Dec. 7, 1989

[51] Int. Cl.$^5$ .............................................. G01S 3/80
[52] U.S. Cl. ................................................... 367/128
[58] Field of Search .................. 367/138, 13, 4, 137, 367/128; 73/643, 642, 627; 350/358, 96.15

[56] References Cited

U.S. PATENT DOCUMENTS

| | | | |
|---|---|---|---|
| 4,156,136 | 5/1979 | Strum et al. | 367/137 |
| 4,169,662 | 10/1979 | Kaule et al. | 350/358 |
| 4,329,876 | 5/1982 | Chen et al. | 73/627 |
| 4,379,409 | 4/1983 | Primbsch et al. | 73/643 |
| 4,473,896 | 9/1984 | Loeser et al. | 367/4 |
| 4,717,862 | 1/1988 | Anderson | 367/13 |

Primary Examiner—Thomas H. Tarcza
Assistant Examiner—Daniel T. Pihulic
Attorney, Agent, or Firm—Kenneth E. Walden; Jacob Shuster

[57] ABSTRACT

Propagation of modulated radiation from a platform is substantially limited to unidirectional transmission through a body of water. Acoustical energy is generated at the surface of a remote object submerged in the water in response to impingement and absorption of the modulated radiation from the platform. Radiation of the acoustical energy generated adjacent the object is detected at the platform to extract data therefrom from which the location of the object relative to the platform is indicated.

15 Claims, 2 Drawing Sheets

UNDERWATER OBJECT DETECTION SYSTEM

BACKGROUND OF THE INVENTION

This invention relates generally to the detection of submerged objects and more particularly to the detection of objects beneath the surface of environmental waters by signal energy radiation.

The detection of submerged objects, such as underwater obstructions to marine travel including sunken vessels, debris, large sea life, etc., by echo-ranging techniques involving the radiation of signal energy, is generally well known in the art. Such systems for detecting underwater objects from a moving platform in the form of a marine vessel or an airborne aircraft such as a helicopter, were heretofore of an optical type or an acoustical type. Optical types of systems heretofore involved the exclusive use of electromagnetic radiation for the detection of submerged objects near the surface of environmental waters. In the latter type of remote detection system, the radiation emitted from a laser transmitter, for example, would suffer considerable attenuation during propagation through the water toward the object and more severe attenuation during reflection from the object as an echo to be picked up by the receiver. The severity of such attenuations would depend upon the concentration of particulate matter in the water to thereby limit the detection range through water having any significant optical turbidity.

The signal attenuation problem usually associated with optical systems is less severe in acoustical detection systems operating at frequencies below 100 KHz for example. Nevertheless, such acoustical detection systems suffer from water volume and water surface reverberation problems. In particular, water surface reverberations compete with the echoes from an object close to the water surface so as severely limit the detection range.

It is therefore an important objective of the present invention to provide a remote object detection system involving the transmission and return of radiated signal energy through the body of water within which the object is located without the optical attenuations associated with electromagnetic radiation systems or the problems involving surface and volume reverberation associated with acoustical detection systems as aforementioned.

SUMMARY OF THE INVENTION

In accordance with the present invention, a combined optical-acoustic system avoids the aforementioned problems associated with the prior art arising from bi-directional radiation attenuation and echo interference by utilizing electromagnetic radiation limited to unidirectional propagation through the water to the object. Such unidirectional limit is achieved by modulation at the platform transmitter which also optimizes generation of acoustical signal energy at the object in response to absorption of the impinging electromagnetic radiation. Generation of the acoustical signal energy at the object rather than on the transmitter platform at which the receiver is located, avoids the reverberation problem aforementioned in connection with the prior art. Further, by appropriate modulation of the electromagnetic radiation, which triggers generation of the acoustical signal energy at the object, the signal-to-noise ratio of the acoustical energy detected at the platform mounted receiver may be optimized to enhance extraction of accurate data on the location and motion of the detected object relative to the transmitter and receiver mounting platform.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENTS

Figure 1:
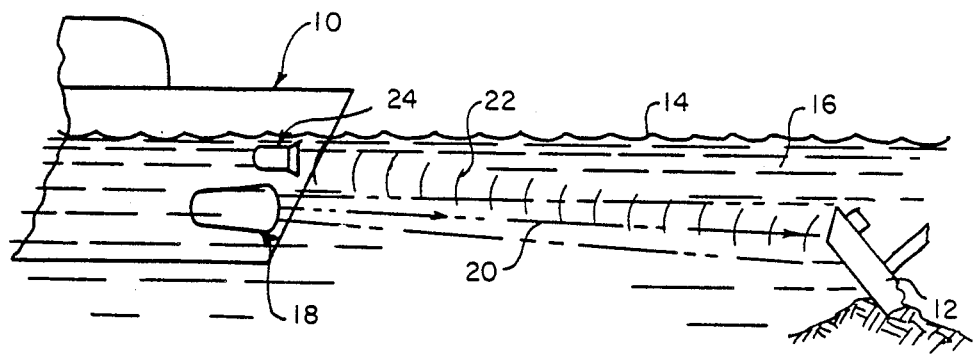
FIG. 1 is a schematic side elevation view depicting application of a remote object detection system in accordance with one embodiment of the present invention.

Referring now to the drawing in detail, FIG. 1 illustrates a moving platform in the form of a marine vessel generally referred to by reference numeral 10 approaching a relatively remote underwater object 12 located at some location below the surface 14 of an environmental body of water 16 through which the marine vessel 10 is moving. In the embodiment of the invention depicted in FIG. 1, the marine vessel 10 mounts below the water surface 14 an electromagnetic radiation transmitter, generally referred to by reference numeral 18, such as a laser transmitter. As shown, a beam of electromagnetic radiation 20 is emitted from the transmitter 18 in the direction of the underwater object 12. As a result of the impingement of the electromagnetic radiation on the object 12, acoustical energy is generated at or adjacent to the object 12 within the water and radiated therefrom through the water indicated by reference numeral 22 for pickup by an acoustical receiver generally referred to by reference numeral 24 in FIG. 1, shown mounted by the platform vessel 10 below the water surface 14.

Figure 2:
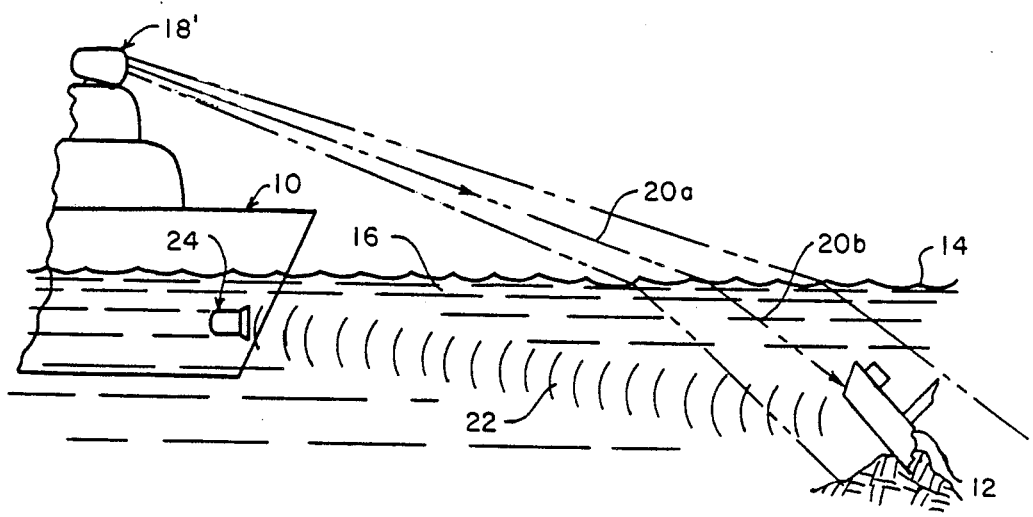
FIG. 2 is a schematic side elevation view depicting application of a remote object detection system in accordance with another embodiment of the present invention.

The embodiment illustrated in FIG. 2 is similar to that of FIG. 1 except that the electromagnetic laser transmitter 18' is mounted on the platform vessel 10 above the water surface 14. Accordingly, the electromagnetic radiation beam emitted from transmitter 18' includes a portion 20A propagated through the atmospheric air to the medium interface between the air and the water at the water surface 14 from which the beam continues along a portion 20B at an angle to portion 20A toward the object 12 through the body of water 16.

Figure 3:
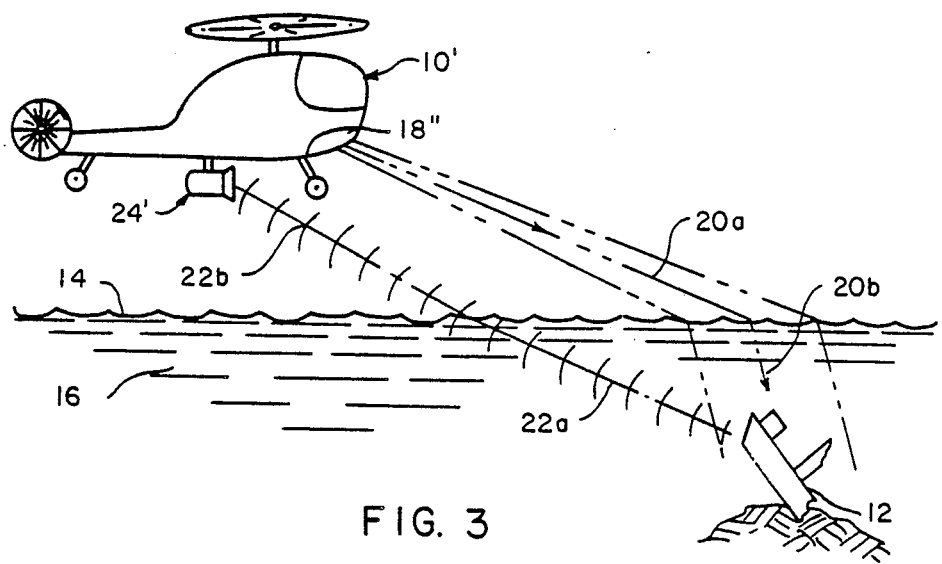
FIG. 3 is a schematic side elevation view depicting application of a remote object detection system in accordance with yet another embodiment of the present invention.

According to the embodiment of the invention depicted in FIG. 3, a helicopter type of aircraft 10' constitutes the moving platform for a laser transmitter 18" from which the electromagnetic beam is emitted, such beam having a portion 20A propagated through the air and a portion 20B propagated through the water to the object 12 as described in connection with FIG. 2. The acoustical energy originated at the object 12, on the other hand, is radiated through the water and the air as indicated at 22A and 22B before reaching the receiver 24' suspended below the helicopter aircraft platform 10', shown in an airborne state in FIG. 3 during which the underwater object 12 is detected in accordance with the present invention.

Figure 4:
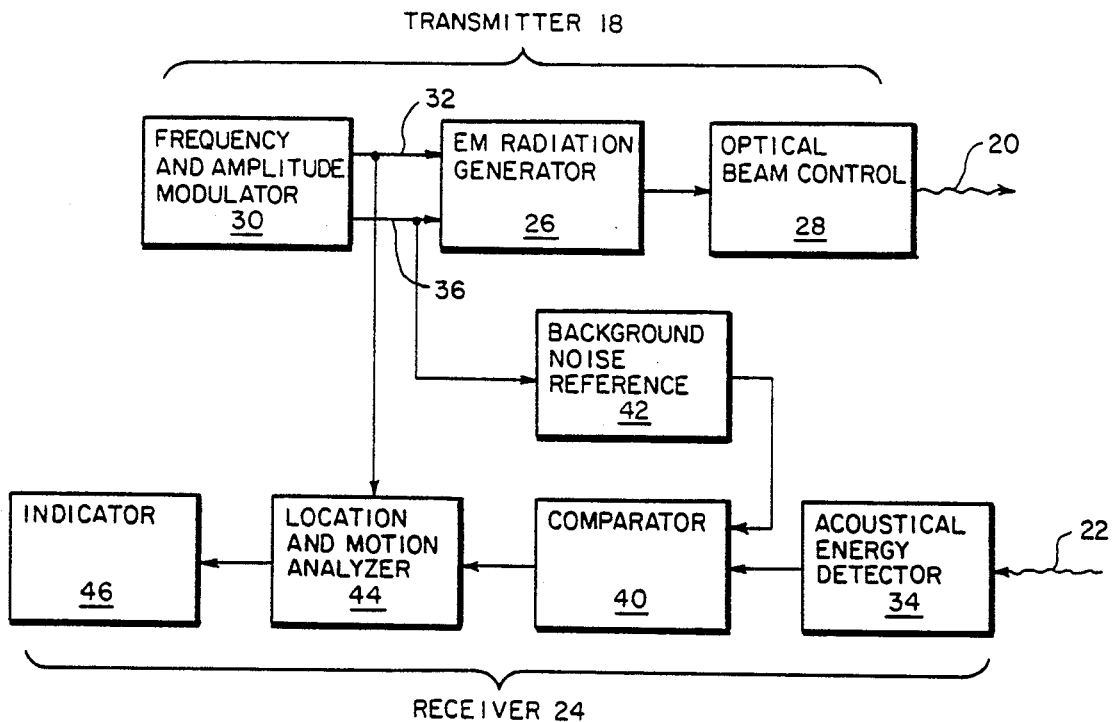
FIG. 4 is a schematic block diagram depicting in greater detail the components associated with the remote object detection system of the present invention.

Referring now to FIG. 4, the transmitter 18 as hereinbefore referred to in connection with FIG. 1 by way of example, includes a laser generator 26 from which the electromagnetic radiation originates. The radiation output of the generator 26 is optically directed along the aforementioned radiation beam 20 to scan a forwardly spaced detection zone within which the underwater object 12 is located, in a manner generally known in the art, by means of an optical beam control component 28. The frequency of the radiation in beam 20 is selected so as to minimize absorption of the electromagnetic radiation energy by the water through which the beam is transmitted. A signal modulator 30, generally known in the art, is operatively connected to the radiation generator for signal frequency modulating purposes through its output 32. Modulation frequency is selected for the electromagnetic radiation to minimize attenuation of the acoustical signals generated at the object by its absorption of the electromagnetic radiation within the water through which it travels.

As a result of the absorption of the electromagnetic radiation by the object, heat is generated at the interface between the absorbing surface of the object 12 and the less absorptive body of water to cause localized surface expansion of the object and generation of acoustical energy propagated in all directions from its radiation impinging and absorbing surface. Some of such radiated acoustical energy 22 as aforementioned in connection with FIG. 1 reaches an acoustical energy detector, such as a hydrophone component associated with the vessel platform receiver 24 as depicted in FIG. 4. The acoustical energy picked up by detector 34 will suffer attenuation during propagation through the water in dependence on the acoustical frequency and its travel either through the water alone as depicted in FIGS. 1 and 2 or through water and air as depicted in FIG. 3. Accordingly, the intensity of the acoustical energy picked up by detector 34 will be a function of the intensity of the acoustical energy generated at the underwater object as aforementioned which in turn depends on the amplitude of the electromagnetic radiation and its modulating frequency under control of the modulator 30 as aforementioned to optimize the acoustical signal-to-noise ratio at the detector 34. The amplitude control of modulator 30 is reflected in its output 36 as schematically depicted in FIG. 4. Thus, the intensity of the acoustical energy generated at the object increases with amplitude and modulation frequency of the electromagnetic radiation transmitted from the platform 10. The acoustical energy thereby generated at the underwater object has the same modulation frequency as the electromagnetic radiation. Absorption of the acoustical energy by the water through which it is propagated increases with increasing frequency tending to decrease propagation distance. Such effect on propagation range is partially offset by a decrease in background noise with increasing frequency below approximately 100 $KH_z$. Accordingly, selection of the modulating characteristics for the electromagnetic radiation through the modulator 30 enables one to optimize the acoustical signal-to-noise ratio for a given operational distance or range within which underwater objects are to be detected.

Figure 5:
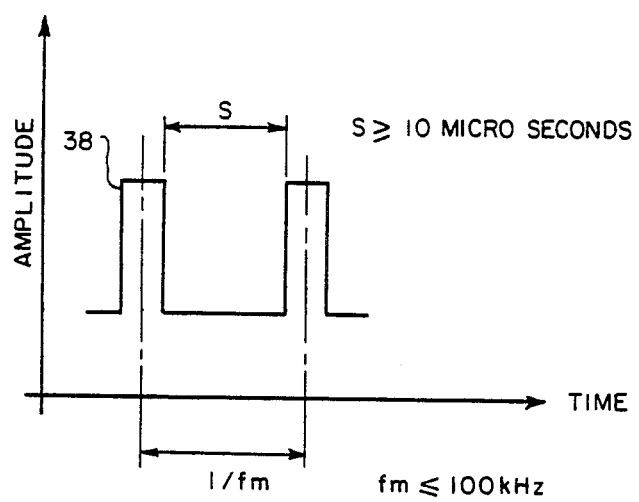
FIG. 5 is a graphical illustration of certain signal characteristics associated with the remote object detecting system of the present invention.

In accordance with certain embodiments of the invention found useful in detecting underwater objects from moving marine vessel types of platforms, a modulating frequency equal to or less than 100 $KH_z$ is deemed to be suitable in connection with a microsecond pulsed laser type of electromagnetic radiation as depicted by curve 38 in FIG. 5. The laser pulses of microsecond duration as graphically depicted in FIG. 5, have a separation (s) equal to or greater than 10 microseconds as also shown in FIG. 5 in order to achieve the objective, of the present invention in accordance with the embodiment aforementioned.

Referring once again to FIG. 4, the desired data is extracted from the output of the acoustical energy detector 34 in accordance with techniques generally known in the art. For example, the output of detector 34 is applied to one input of a comparator 40 having another input to which the output of a background noise reference component 42 is applied. A substantially noise free output from the comparator 40 is accordingly applied to a location and motion analyzer 44 having an output connected to the indicator 46. The analyzer 44 measures difference in time between emission of a modulation pulse or pulse train from the generator 2 and reception of the corresponding acoustical pulse or pulse train by the acoustic receiver 34. Such time difference is divided by the speed of sound in water to determine the distance of the object from the receiver for display of location and distance data by the indicator 46 in accordance with well known prior art techniques.

Readout of the indicator 46 will accordingly provide the operator with information as to the location of the underwater object 12, relative to the platform location of the receiver. The analyzer 44 may also be arranged to supply the indicator 46 with data for display of the object speed component toward or away from the platform location of receiver by calculating the change in distance to the object with respect to each second of time.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A system for detecting an object within a surrounding medium in contact therewith, including a platform, signal energy emitting means mounted on the platform for transmission of radiation to the object through said surrounding medium, modulating control means connected to the signal energy emitting means for effecting generation of acoustical energy adjacent the object in response to absorption of the radiation therein unidirectionally transmitted from the platform, receiver means on the platform for detection of the acoustical energy generated adjacent the object and analyzer means operatively connected to the receiver means for indicating location of the object relative to the platform in response to said detection of the acoustical energy, said generation of the acoustical energy being effected by surface heat produced on the object in response to absorption therein of the transmitted radiation causing localized volumetric expansion of the surrounding medium in contact with the object.

2. The system as defined in claim 1 wherein said surrounding medium is water within which the transmitted radiation is attenuated.

3. A method for locating an object submerged in a body of water by transmission of signal energy between said object and a detection location remote therefrom, including the steps of: selecting a first form of the signal energy for propagation with attenuation through said body of water; controllably radiating said first form of the signal energy for said propagation through the body of water to effect generation of a second form of the signal energy at the object; and detecting radiation of the second form of the signal energy at the detection location in response to substantially unidirectional transmission of said first form of the signal energy during said propagation thereof through the body of water from the detection location, said generation of the second form of the signal energy occuring adjacent tot he object in response to absorption therein of the first form of the signal energy.

4. The method of claim 3 wherein said step of controllably radiating the first form of the signal energy includes modulation thereof at selected frequencies and amplitudes minimizing said attenuation by the water and optimizing the signal-to-noise ratio of the second form of the signal energy detected at the detection location.

5. The method of claim 4 wherein said first and second forms of the signal energy are electromagnetic and accoustical, respectively.

6. The method of claim 3 wherein said step of controllably radiating the first form of the signal energy includes modulation thereof at selected frequencies and amplitudes minimizing said attenuation by the water and optimizing the signal-to-noise ratio of the second form of the signal energy detected at the detention location.

7. The method of claim 3 wherein said first and second forms of the signal energy are electromagnetic and acoustical, respectively.

8. A system for detecting an object within water remote from a platform, including means for generating acoustical energy adjacent said object in response to impinging electromagnetic radiation, detector means on the platform for detection of the acoustical energy generated adjacent the object and analyzer means operatively connected to the detector means for indicating location of the object relative to the platform in response to said detection of the acoustical energy, said acoustical energy generating means a radiation generator at the platform from which the electromagnetic radiation originates, control means connected to the generator for directing the electromagnetic radiation to a scanning zone within which the object is located and modulating means connected to the generator for substantially limiting said detection to the acoustical energy generated in response to the transmission of the electromagnetic radiation in one direction to the object through the water, said platform being a moving marine vessel.

9. The system as defined in claim 8 wherein said radiation generator is mounted by the marine vessel below surface level of the water.

10. The system as defined in claim 8 wherein said radiation generator is mounted by the marine vessel above water level.

11. A system for detecting an object within water remote from a platform, including means for generating acoustical energy adjacent said object in response to impinging electromagnetic radiation, detector means on the platform for detection of the acoustical energy generated adjacent the object and analyzer means operatively connected to the detector means for indicating location of the object relative to the platform in response to said detection of the acoustical energy, said acoustical energy generating means including a radiation generator at the platform from which the electromagnetic radiation originates, control means connected to the generator for directing the electromagnetic radiation to a scanning zone within which the object is located and modulating means connected to the generator for substantially limiting said detection to the acoustical energy generated in response to the transmission of the electromagnetic radiation in one direction to the object through the water, said platform being a moving aircraft.

12. A system for detecting an object within a surrounding medium remote from a platform, including means for generating acoustical energy adjacent said object in response to impinging electromagnetic radiation, detector means on the platform for detection of the acoustical energy generated adjacent the object and analyzer means operatively connected to the detector means for indicating location of the object relative to the platform in response to said detection of the acoustical energy, said acoustical energy generating means including a radiation generator at the platform from which the electromagnetic radiation originates, control means connected to the generator for directing the electromagnetic radiation to a scanning zone within which the object is located and modulating means connected to the generator for substantially limiting said detection to the acoustical energy generated in response to the transmission of the electromagnetic radiation in one direction to the object through the surrounding medium said radiation generator being a LASER transmitter.

13. A system for detecting an object within a surrounding medium in contact therewith, including a platform, signal energy emitting means mounted on the platform for transmission of radiation to the object through said surrounding medium, modulating control means connected to the signal energy emitting means for effecting generation of acoustical energy adjacent the object in response to absorption of the radiation therein unidirectionally transmitted from the platform, receiver means on the platform for detection of the acoustical energy generated adjacent the object and analyzer means operatively connected to the receiver means for indicating location of the object relative to the platform in response to said detection of the acoustical energy, said surrounding medium being water within which the transmitted radiation is attenuated, and said platform being a marine vessel.

14. A system for detecting an object within a surrounding medium in contact therewith, including a platform, signal energy emitting means mounted on the platform for transmission of radiation to the object through said surrounding medium, modulating control means connected to the signal energy emitting means for effecting generation of acoustical energy adjacent the object in response to absorption of the radiation therein unidirectionally transmitted from the platform, receiver means on the platform for detection of the acoustical energy generated adjacent the object and analyzer means operatively connected to the receiver means for indicating location of the object relative to the platform in response to said detection of the acoustical energy, said surrounding medium being water within which the transmitted radiation is attenuated, and said platform being an airborne aircraft.

15. A system for detecting an object within a surrounding medium in contact therewith, including a platform, signal energy emitting means mounted on the platform for transmission of radiation to the object through said surrounding medium, modulating control means connected to the signal energy emitting means for effecting generation of acoustical energy adjacent the object in response to absorption of the radiation therein unidirectionally transmitted from the platform, receiver means on the platform for detection of the acoustical energy generated adjacent the object and analyzer means operatively connected to the receiver means for indicating location of the object relative to the platform in response to said detection of the acoustical energy, said surrounding medium being water within which the transmitted radiation is attenuated, and said generation of the acoustical energy being effected by surface heat produced on the object in response to said absorption therein of the transmitted radiation causing localized volumetric expansion of the water in contact with the object.

* * * * *